United States Patent [19]

Morris et al.

[11] Patent Number: 4,728,717
[45] Date of Patent: Mar. 1, 1988

[54] POLYESTERS OF TRANS-4,4'-STILBENEDICARBOXYLIC ACID, 1,4-CYCLOHEXANEDIMETHANOL AND 1,4-BUTANEDIOL

[75] Inventors: John C. Morris; Winston J. Jackson, Jr., both of Kingsport, Tenn.

[73] Assignee: Eastman Kodak Company, Rochester, N.Y.

[21] Appl. No.: 23

[22] Filed: Jan. 2, 1987

[51] Int. Cl.$^4$ .................... C08G 63/52; C08G 63/54
[52] U.S. Cl. .................... 528/306; 528/302; 528/305
[58] Field of Search .................... 528/302, 305, 306

[56] References Cited

U.S. PATENT DOCUMENTS

| | | | |
|---|---|---|---|
| 4,459,402 | 7/1984 | Morris et al. | 528/298 |
| 4,551,520 | 11/1985 | Morris et al. | 528/302 |
| 4,578,453 | 3/1986 | Jackson | 528/302 |

Primary Examiner—Lucille M. Phynes
Attorney, Agent, or Firm—John F. Stevens; William P. Heath, Jr.

[57] ABSTRACT

The polyesters of trans-4,4'-stilbenedicarboxylic acid, 95 to 50 mol % 1,4-butanediol, and 5 to 50 mol % 1,4-cyclohexanedimethanol can be injection-molded to give shaped objects having exceptionally high tensile strength and heat resistance. Many of the polyesters also have excellent hydrolytic stability and chemical resistance. The polyesters of this invention can be molded, extruded into film, or spun into fibers having these properties.

7 Claims, No Drawings

POLYESTERS OF TRANS-4,4'-STILBENEDICARBOXYLIC ACID, 1,4-CYCLOHEXANEDIMETHANOL AND 1,4-BUTANEDIOL

DESCRIPTION

1. Technical Field

This invention relates to high molecular weight copolyesters which are useful as films, fibers, and molding plastics. This invention is particularly concerned with copolyesters of trans-4,4'-stilbenedicarboxylic acid, 1,4-butanediol, and 1,4-cyclohexanedimethanol.

2. Background of the Invention

U.S. Pat. No. 2,657,195 broadly discloses polyesters of various stilbenedicarboxylic acid isomers with glycols, aminoalcohols, and diamines. Various glycols are disclosed containing 2 to 16 carbon atoms, but copolyesters of 1,4-cyclohexanedimethanol and 1,4-butanediol are not specifically disclosed.

U.S. Pat. No. 3,496,839 relates to low molecular weight homopolymers of 4,4'-stilbenedicarboxylic acid and aliphatic glycols useful in radiation-cured crosslinked polyester coatings. Column 2, lines 20 to 44, contain a general listing of the glycols useful in these coatings. No examples are given using a combination of 1,4-butanediol and 1,4-cyclohexanedimethanol. Neither U.S. Pat. No. 2,657,195 nor U.S. Pat. No. 3,496,839 distinguishes one stilbenedicarboxylic acid isomer from another, i.e., 4,4'- from 3,3'- or cis- from trans-, etc.

Our own U.S. Pat. No. 4,420,607 (issued Dec. 13, 1983), U.S. Pat. No. 4,459,402 (issued Feb. 10, 1984), U.S. Pat. No. 4,468,510 (issued Aug. 28, 1984), U.S. Pat. No. 4,526,822 (issued July 2, 1985) all disclose polyesters based on stilbenedicarboxylic acid using various glycols. No examples of copolyesters based on the glycols claimed herein are specifically disclosed.

Our U.S. Pat. No. 4,551,520 discloses copolyesters based on terephthalic acid, trans-4,4'-stilbenedicarboxylic acid and 1,4-cyclohexanedimethanol.

Other patents which disclose trans-4,4'-stilbenedicarboxylic acid are Japanese Kokai 72348/74 and U.S. Pat. Nos. 2,657,194; 3,190,174; 3,247,043; 3,842,040; 3,842,041 and 4,073,777. Polyesters of trans-4,4'-stilbenedicarboxylic acid and neopentyl glycol, 1,5-pentanediol, 1,6-hexanediol, and 1,10-decanediol are disclosed by Meurisse, et al, in the *British Polymer Journal,* Vol. 13, 1981, page 57 (Table 1). Jackson and Morris disclose homopolyesters from trans-4,4'-stilbenedicarboxylic acid and various aliphatic glycols in the *Journal of Applied Polymer Science, Applied Polymer Symposia,* 41, 307–326 (1985). Our copending applications filed of even date herewith entitled "Polyesters of trans-4,4'-Stilbenedicarboxylic Acid, 1,6-Hexanediol, and 1,4-Butanediol", "Polyesters of trans-4,4'-Stilbenedicarboxylic Acid, 1,6-Hexanediol, and Ethylene Glycol", "Polyesters of trans-4,4-Stilbendicarboxylic Acid, Hexanediol and 1,4-Cyclohexanedimethanol", and "Polyesters of trans-4,4-Stilbendicarboxylic Acid, Ethylene Glycol and 1,4-Butanediol" also disclose polyesters based on trans-4,4'-stilbenedicarboxylic acid. No examples of copolyesters based on trans-4,4'-stilbenedicarboxylic acid, 1,4-butanediol and 1,4-cyclohexanedimethanol are specifically disclosed.

DISCLOSURE OF THE INVENTION

The prior art discloses molding, spinning, and extruding into film as viable processes for shaping polymers based on stilbenedicarboxylic acid. We have discovered copolyesters based on trans-4,4'-stilbenedicarboxylic acid, 1,4-butanediol, and 1,4-cyclohexanedimethanol having good processability, excellent hydrolytic stability, excellent chemical resistance, high tensile strength, high flexural modulus, high flexural strength, high Izod impact strength, and high heat deflection temperature.

According to the present invention, there are provided copolyesters comprising repeating units from at least 80 mol % trans-4,4'-stilbenedicarboxylic acid, repeating units from about 95–50 mol % 1,4-butanediol and repeating units from about 5–50 mol % 1,4-cyclohexanedimethanol, the total mol % of acid components and glycol components each being 100 mol %, and the polyester having an inherent viscosity of 0.3 or more as determined at 25° C. in 25/35/40 (wt/wt/wt) phenol/tetrachloroethane/p-chlorophenol at a concentration of 0.1 g/100 mL.

Injection-molded bars consisting of copolyesters having repeating units from 100 mol % trans-4,4'-stilbenedicarboxylic acid, repeating units from 95 to 50 mol % 1,4-butanediol, and repeating units from 5 to 50 mol % 1,4-cyclohexanedimethanol have an outstanding combination of properties. In addition, many of the copolyesters of this invention have exceptionally good hydrolytic stability retaining 100% of their tensile strength after exposure in boiling water for ten days.

The copolyesters of this invention are prepared from trans-4,4'-stilbenedicarboxylic acid and/or its esters, 1,4-butanediol, and 1,4-cyclohexanedimethanol. Examples of useful esters are the dimethyl, diethyl, dibutyl, diphenyl, or any combination of these mixed esters. The copolyesters may also be prepared from glycol esters or half-ester/half-acid derivatives of trans-4,4'-stilbenedicarboxylic acid.

The trans-4,4'-stilbenedicarboxylic acid portion of the polymers may contain minor amounts of other aromatic dicarboxylic acids such as terephthalic acid, isophthalic acid, 1,5-, 1,4-, 2,6-, or 2,7-naphthalenedicarboxylic acid, 4,4'-biphenyldicarboxylic acid, and the like. The dicarboxylic acid portion of the polymer may also contain minor amounts of aliphatic dicarboxylic acids such as malonic, succinic, glutaric, adipic, pimelic, suberic, azelaic, sebacic, cis- or trans-1,4-cyclohexanedicarboxylic, or dodecanedicarboxylic acid. These polyesters may contain up to about 20 mol % of these other dicarboxylic acids such that the sum of the dicarboxylic acid components is equal to 100 mol %. Essentially pure trans-4,4'-stilbenedicarboxylic is preferred.

The glycol portion of these polymers consists essentially of 95–50 mol % 1,4-butanediol units and 5–50 mol % 1,4-cyclohexanedimethanol units. The 1,4-cyclohexanedimethanol portion of these polymers may consist of the trans isomer or the cis isomer or any mixture thereof. A 70/30 trans/cis isomer mixture which is commercially available is preferred. The glycol portion of these polymers may also contain minor amounts (not exceeding about 20 mol %) of other glycols such that the sum of the glycol components is equal to 100 mol %. Examples of useful glycols are ethylene glycol, 1,2-propanediol, 1,3-propanediol, 2,2-dimethyl-1,3-propanediol, trans- or cis-2,2,4,4-tetramethyl-1,3-cyclobutanediol, 1,5-pentanediol, 1,6-hexanediol or p-xylenediol.

The polyesters of this invention have excellent solvent resistance. Injection-molded bars are unaffected after exposure for 24 hours to toluene, 1,2-dichloroethane, methyl isobutyl ketone, ethyl acetate, ethanol, water, 20% sulfuric acid, 10% sodium hydroxide, regular grade gasoline, acetone, acetic acid 5% Chlorox bleach, 50/50 water/ethanol, benzyl alcohol, 10% nitric acid and methylene chloride.

Poly(ether-imides) such as Ultem poly(ether-imide), polyphenylene oxides such as poly(2,6-dimethylphenylene oxide) or polyphenylene oxide/polystyrene blends such as Noryl, polyesters, poly(ester-carbonates), polycarbonates such as Lexan, polysulfones, poly(sulfone-ethers), and poly(ether-ketones) of aromatic dihydroxy compounds may be used as blend modifiers to modify the properties of the copolyesters of this invention.

The copolyesters of this invention may contain antioxidants, conventional flame retardants such as phosphorus or halogen compounds, fillers such as talc or mica, or reinforcing agents such as glass fiber or carbon fiber.

The inherent viscosity of the copolyesters of this invention are at least 0.3 and preferably 0.6 or more. The copolyesters are prepared in the melt or by solid-phase polymerization or by a combination of these processes.

The examples which follow are submitted for a better understanding of the invention. The examples illustrate the exceptionally high tensile strength of the copolyesters of this invention (Table 1).

The inherent viscosities are determined at 25° C. in 25/35/40 (wt/wt/wt) phenol/tetrachloroethanol/p-chlorophenol at a concentration of 0.1 g/100 mL.

The polyesters are ground to pass a 3-mm screen, dried at 100° C. in a vacuum oven for 24 hours, and injection-molded on a 1-oz Watson-Stillman molding machine to give 5×½×⅛-in. flexure bars and 1/16-in. thick D1822 Type L tensile bars. The tensile strength is determined following the procedure of ASTM D638, the heat deflection temperature is determined following the procedure of ASTM D648 (264 psi load), the flexural properties are determined according to ASTM D790, and notched and unnotched Izoc impact strengths according to ASTM D256 Method A.

EXAMPLE 1

This example illustrates the preparation of a polymer consisting of 100 mol % trans-4,4'-stilbenedicarboxylic acid units, 60 mol %, 1,4-butanediol units, and 40 mol % 1,4-cyclohexanedimethanol units.

A mixture of 192.4 g (0.650 mol) dimethyl trans-4,4'-stilbenedicarboxylate, 87.8 g (0.975 mol) 1,4-butanediol, 80.2 g (0.39 mol) 70% 1,4-cyclohexanedimethanol (70% trans/30% cis) in methanol, and 0.12 g titanium tetraisopropoxide is placed in a 1-liter flask equipped with an inlet for nitrogen, a metal stirrer, and a short distillation column. The flask is heated for about 1½ hours at 190° C., for 1 hour at 220° C. and at 260° C. for about 30 minutes. The temperature is raised to 300° C. and a vacuum of 0.5 mm is gradually applied over the next 5 minutes. Full vacuum is maintained for about 30 minutes before the reaction is stopped. A very high melt viscosity, opaque polymer is obtained with an I.V. of 1.07. The polymer is solid-phase polymerized to an I.V. of 1.49 by heating ground polymer 1 hour at 110° C. and 1½ hour at 240° C. Injection-molded tensile bars have a tensile strength of 33,700 psi and an elongation of 15%. Injection-molded flexure bars have a flexural modulus of 5.4×10⁵ psi, flexural strength of 19,600 psi, heat-deflection temperature of 254° C., notched Izod impact strength of 9.5 ft-lb/in., and unnotched Izod impact strength of 29 ft-lb/in.

The remaining polymers in Table 1 are prepared according to procedures similar to those used in Example 1.

TABLE 1

Molding Plastics Properties of Copolyesters of trans-4,4'-Stilbenedicarboxylic Acid 1,4-Butanediol, and 1,4-Cyclohexanedimethanol

| Ex. | BD Content$^a$ mol % | CD Content$^a$ mol % | Molding Temp.$^b$ °C. | I.V. before molding$^c$ | I.V. After molding$^c$ | Tensile Strength 10³ psi |
|---|---|---|---|---|---|---|
| 2 | 100$^e$ | 0 | 320 | 1.19 | 1.03 | 17.0 |
| 3 | 100$^e$ | 0 | 325 | 1.13$^d$ | 0.93 | 15.5 |
| 4 | 100$^e$ | 0 | 330 | 1.13$^d$ | 1.01 | 17.7 |
| 5 | 100$^e$ | 0 | 335 | 1.13$^d$ | 0.91 | 14.4 |
| 6 | 95$^e$ | 5 | 320 | 1.50 | 1.37$^d$ | 18.8 |
| 7 | 92$^e$ | 8 | 310 | 1.30 | 1.21 | 33.9 |
| 8 | 92$^e$ | 8 | 310 | 1.48 | 1.23 | 26.8 |
| 9 | 84 | 16 | 300 | 1.21 | 1.18 | 35.6 |
| 10 | 75 | 25 | 290 | 1.25 | 1.29 | 36.3 |
| 11 | 65 | 35 | 295 | 1.47 | 1.39 | 38.2 |
| 1 | 60 | 40 | 315 | 1.49 | 1.31 | 33.7 |
| 12 | 55$^e$ | 45 | 335 | 1.53 | 1.38 | 35.8 |
| 13 | 51$^f$ | 49 | 330 | 1.02 | 1.00$^d$ | 22.0 |
| 14 | 44$^g$ | 56 | 330 | 1.15$^d$ | 0.90$^d$ | 17.8 |

$^a$BD content and HD content were determined using proton NMR spectroscopy.
$^b$The polymers were molded on a 1-oz Watson-Stillman molding machine.
$^c$Inherent viscosities were determined in 25/35/40 phenol/tetrachloroethane/p-chlorophenol at a concentration of 0.1 g/100 mL at 25° C.
$^d$Insoluble material was reported during the I.V. determination.
$^e$This polymer solidified at 290° C. during melt preperation. Solid-phase polymerization was used to prepare high molecular weight polymer.
$^f$The polymer was prepared in the melt at 300° C. Solid-phase polymerization was used to prepare high molecular weight polymer.
$^g$The polymer was prepared in the melt at 310° C. Solid-phase polymerization was used to prepare high molecular weight polymer.
Codes:
SDA = trans-4,4-stilbenedicarboxylic acid
BD = 1,4-butanediol
CD = 1,4-cyclohexanedimethanol 70% trans/30% cis.

The examples in the table illustrate an unexpected increase in tensile strength beginning at about 5 mol % 1,4-cyclohexanedimethanol and 95 mole % 1,4-butanediol. A dramatic increase is seen at about 8 mole % 1,4-cyclohexanedimethanol and 92 mole % 1,4-butanediol. Above about 50 mole % 1,4-cyclohexanedimethanol, the copolyester is too high in melting temperature to process without degradation using conventional techniques.

Unless otherwise specified, all parts, percentages, ratios, etc., are by weight.

The invention has been described in detail with particular reference to preferred embodiments thereof, but it will be understood that variations and modifications can be effected within the spirit and scope of the invention.

We claim:

1. A copolyester comprising repeating units from at least 80 mol % trans-4,4'-stilbenedicarboxylic acid, repeating units from about 95–50 mol % 1,4-butanediol and repeating units from about 5–50 mol % 1,4-cyclohexanedimethanol, the total mol % of acid components and glycol components each being 100 mol %, and said polyester having an inherent viscosity of 0.3 or more determined at 25° C. in 25/35/40 (wt/wt/wt) phenol/tetrachloroethane/p-chlorophenol at a concentration of 0.1 g/100 mL.

2. A polyester according to claim 1 wherein the trans-4,4'-stilbenedicarboxylic acid is present in an amount of about 100 mol %.

3. A polyester according to claim 1 wherein the acid component comprises up to 20 mol % of at least one other aromatic dicarboxylic acid having 8 to 20 carbon atoms.

4. A copolyester according to claim 1 wherein the I.V. is greater than 0.6.

5. A fiber comprising the copolyester of claim 1.

6. A film comprising the copolyester of claim 1.

7. A molded object comprising the copolyester of claim 1.

* * * * *